United States Patent [19]

Padget et al.

[11] Patent Number: 4,543,386

[45] Date of Patent: Sep. 24, 1985

[54] VINYLIDENE CHLORIDE COPOLYMER AQUEOUS LATEX COMPOSITION

[75] Inventors: John C. Padget, Frodsham; Donald H. McIlrath, Liverpool, both of England

[73] Assignee: Imperial Chemical Industries PLC, London, England

[21] Appl. No.: 577,881

[22] Filed: Feb. 7, 1984

[30] Foreign Application Priority Data

Feb. 21, 1983 [GB] United Kingdom ............... 8304747
Jul. 28, 1983 [GB] United Kingdom ............... 8320388

[51] Int. Cl.$^4$ .................................................. C08L 33/00
[52] U.S. Cl. ................................... 524/523; 524/522; 524/527
[58] Field of Search ................... 524/523, 522, 527

[56] References Cited

U.S. PATENT DOCUMENTS

| | | |
|---|---|---|
| 2,636,870 | 7/1953 | Connors et al. |
| 2,976,203 | 3/1961 | Young et al. |
| 2,976,204 | 3/1961 | Young et al. |
| 3,012,001 | 12/1961 | Smith ............... 524/523 |
| 3,014,004 | 12/1961 | Meier ............... 524/523 |
| 3,206,427 | 9/1965 | Butzler et al. ............... 524/523 |
| 3,222,419 | 12/1965 | Jubilee . |
| 3,374,197 | 11/1968 | England et al. |
| 3,787,232 | 1/1974 | Mikofalvy et al. ............... 117/161 |
| 4,057,527 | 11/1977 | Columbus . |
| 4,130,528 | 12/1978 | Chen . |
| 4,280,942 | 7/1981 | Green . |
| 4,339,365 | 7/1982 | Becher et al. ............... 524/523 |
| 4,341,679 | 7/1982 | Burgess et al. ............... 526/317 |

FOREIGN PATENT DOCUMENTS

| | | | |
|---|---|---|---|
| 48-68627 | 9/1973 | Japan ............... 524/523 |
| 51-55350 | 5/1976 | Japan ............... 524/523 |
| 52-58734 | 5/1977 | Japan ............... 524/523 |
| 1459843 | 12/1976 | United Kingdom . |
| 1557289 | 12/1979 | United Kingdom . |
| 2060655 | 4/1981 | United Kingdom . |

OTHER PUBLICATIONS

Lamination by Arthur Hirsch, Handbook of Adhesives, edited by Irving Skeist, 1st ed. a Nostrand Reinhold Co.
Industrial Adhesives and Sealants, edited by B. S. Jackson, Hutchinson Benham, London.
High Performance Water Borne Laminating Adhesives by Roger J. Isbister et al., Proc. Tappi Paper Synth. Conf., Atlanta, 1982.

*Primary Examiner*—Joseph L. Schofer
*Assistant Examiner*—N. Sarofim
*Attorney, Agent, or Firm*—Cushman, Darby & Cushman

[57] ABSTRACT

Aqueous latex composition for use as a contact adhesive comprising a mixture of an amorphous copolymer A and an amorphous copolymer B where A comprises units of vinylidene chloride, an internally plasticizing comonomer like 2-ethylhexyl acrylate or n-butyl acrylate, optionally vinyl chloride and optionally a copolymerizable acid, and has Tg in the range $-50°$ to $<0°$ C., and B comprises units of vinylidene chloride, an alkyl acrylate and/or methacrylate or certain other comonomers, optionally vinyl chloride, and optionally a copolymerizable acid, and has a Tg in the range $0°$ to $30°$ C.

34 Claims, No Drawings

VINYLIDENE CHLORIDE COPOLYMER AQUEOUS LATEX COMPOSITION

The present invention relates to an aqueous latex composition comprising vinylidene chloride copolymers which composition is particularly suitable for the provision of a contact adhesive.

A contact adhesive is a substance which when coated on two substrates to be bonded enables a strong bond to be formed between the substrates on and after initial contact at ambient temperature without the requirement of any sustained pressure or setting time. The contact adhesive is applied to each substrate dissolved or dispersed in a liquid medium and the solutions or dispersions allowed to dry on each substrate before the contact bonding is effected.

In the past, contact adhesives have usually been applied as solvent-based compositions, i.e. in compositions wherein the adhesive substance has been dissolved in an organic liquid solvent. However, in recent years attention has been focussed on the toxicity, flammability and pollution problems associated with such systems. This has stimulated a desire to employ systems where the contact adhesive is less hazardously applied as an aqueous-based composition, i.e. in a composition wherein the adhesive substance is dispersed in water.

Currently, aqueous-based contact adhesive compositions appear to be mainly of two types: Neoprene or modified Neoprene-type compositions and acrylate-type compositions. Examples of the former type are described in U.S. Pat. No. 4,130,528 while examples of the latter type are described in U.S. Pat. Nos. 2,976,203, 2,976,204, 4,057,527, 4,280,942, and British Pat. No. 1459843. The search for new aqueous-based contact adhesive compositions nevertheless continues with the objective of obtaining an improved balance of properties such as contactability, mature bond strength and high temperature creep performance.

We have now discovered that aqueous latex compositions based on certain vinylidene chloride copolymers have excellent utility as contact adhesive compositions, whereby such compositions are readily prepared for customer use and can be used to yield bonds with a good balance of contactability, mature bond strength and high temperature creep performance.

According to the present invention there is provided an aqueous latex composition comprising at least one copolymer A and at least one copolymer B, wherein: A is an amorphous copolymer comprising polymerised units of vinylidene chloride and at least one internally plasticising comonomer; and which copolymer has a Tg in the range from $-50$ to $<0°$ C.; and B is an amorphous copolymer comprising polymerised units of vinylidene chloride and at least one comonomer selected from alkyl acrylates and methacrylates having 1 to 12 carbon atoms in the alkyl group, alkoxyalkyl acrylates and methacrylates having 1 to 12 carbon atoms in the alkyl group, styrene, acrylonitrile, vinyl acetate and vinyl ethyl ether; and which copolymer has a Tg in the range from 0° to 30° C.; and wherein the dry weight ratio of the at least one copolymer A: the at least one copolymer B is from 95:5 to 10:90.

The copolymer A may optionally comprise polymerised units of vinyl chloride and may optionally comprise polymerised units of at least one copolymerisable ethylenically unsaturated acid. The copolymer B may optionally comprise polymerised units of vinyl chloride and may optionally comprise polymerised units of at least one copolymerisable ethylenically unsaturated acid.

There is also provided according to the invention the use of an aqueous latex as defined above as a contact adhesive-forming composition. In accordance with the conventional method of contact bonding, such use is generally effected by coating two substrates to be bonded with the said aqueous latex composition, allowing the aqueous coating on each substrate to dry, and bringing the dry coated substrates into contact usually at ambient temperature and usually without any sustained pressure to effect contact.

By Tg is meant the glass transition temperature.

The aqueous latex composition of the invention provides polymeric layers which (after drying) possess tack (contactability) and also (after contacting) yield a bond having excellent cohesive strength with acceptably low creep at elevated temperatures (e.g. up to 50° C. or above). If copolymer A is used alone, while contactability is usually acceptable the creep at an elevated temperature of the resulting bond may be high. If copolymer B is used alone, contactability is normally nonexistent although creep performance at an elevated temperature may be good. The combination of copolymer B with copolymer A as per the invention surprisingly allows good contactability imparted by A to be retained while improving, often significantly, its creep performance at an elevated temperature, neither copolymer A nor copolymer B in the composition deleteriously affecting to an unacceptable extent the advantageous properties of the other. Additionally, the use of copolymer B can, surprisingly, sometimes also enhance the contactability of copolymer A as well as improving its high temperature creep performance. Furthermore a single copolymer possessing the same overall composition would not possess the same excellent combination of properties.

Both copolymers A and B are amorphous (with less than 5% and more usually substantially zero crystallinity), being non-crystalline in the latex and not crystallising on and/or after removal of the aqueous medium—as e.g. on and/or after bond formation. (Crystalline polymers tend to yield films of zero contactability and so it would not be useful for both A and B to be crystalline).

The weight ratio of the at least one copolymer A: the at least one copolymer B is from 95:5 to 10:90. The Preferred range is 90:10 to 10:90, particularly 80:20 to 20:80 (with 75:25 to 25:75 being a typical range in practice).

The aqueous latex compositions of the invention normally comprise only one copolymer A and only one copolymer B, although it is within the scope of the invention to include more than one copolymer A and-/or more than one copolymer B.

The disposition of copolymers A and B in the aqueous latex composition of the invention is in the form of a mixture of the copolymers. This mixture may e.g. be a simple aqueous latex blend of the at least one copolymer A and the at least one copolymer B prepared by blending together aqueous latices of the separately prepared copolymers. Alternatively, the mixture may be made in-situ by forming the at least one copolymer A in the presence of the at least one copolymer B, or vice versa, using a sequential polymerisation process. When more than one copolymer A and/or copolymer B is used, these may be mixed by simple blending, or by a sequential polymerisation process, or by a combination of simple blending and sequential polymerisation.

The Tg of a copolymer will primarily be determined by the types and amounts of the individual comonomer units in the copolymer. Accordingly a variety of copolymers may readily be prepared having Tg within the ranges specified.

It may be noted that the Tg of a vinylidene chloride copolymer cannot be determined from a formula; instead it is necessary to determine the Tg of such a copolymer by experiment. Typical examples of Tg verses composition relationships for vinylidene chloride copolymers are given in "Polyvinylidene Chloride", R A Wessling, Gordon and Breach, Science Publishers 1977.

The composition of copolymer A should be selected to provide a Tg in the range from −50 to <0° C., and more preferably in the range from −40 to −5° C.

Preferred copolymer compositions for A are copolymers comprising 10 to 70 weight % of polymerised units of vinylidene chloride, 30 to 90 weight % of polymerised units of at least one internally plasticising comonomer, 0 to 20 weight % of polymerised units of vinyl chloride, and 0 to 10 weight % of polymerised units of at least one copolymerisable ethylenically unsaturated acid. Minor amounts of polymerised units of at least one other ethylenically unsaturated comonomer may optionally be included in these preferred polymeric compositions of A (e.g. 0 to 20 weight %), for example minor amounts of polymerised units of at least one ethylenically unsaturated comonomer such as acrylonitrile, styrene, vinyl acetate, vinyl ethyl ether, or a monomer which imparts a specific functionality (e.g. a cross-linking functionality) may be included.

The proportion of polymerised units of vinylidene chloride in the above-mentioned preferred copolymer compositions for A is more preferably 20 to 60 weight %.

By an internally plasticising comonomer is meant a comonomer which gives a homopolymer (when polymerised alone) of very low Tg, preferably $\leq -40°$ C., more preferably $\leq -50°$ C., and so provides copolymerised units in a copolymer which (if present in sufficient proportion) tend to cause the copolymer to be intrinsically plasticised and thereby have considerably lowered Tg in comparison to a polymer not having such units. Thus the use of such comonomers allows various desired values of Tg to be readily achieved. Suitable plasticising comonomers include certain kinds of alkyl and alkoxyalkyl acrylates such as n-butyl acrylate, 2-ethylhexyl acrylate, n-decyl methacrylate, n-octyl acrylate, 2-ethylbutyl acrylate, n-heptyl acrylate, 2-heptyl acrylate, n-hexyl acrylate, 3-methylbutyl acrylate, n-nonyl acrylate, 2-octyl acrylate, n-propyl acrylate, 1-ethoxyethyl acrylate, 1-ethoxypropyl acrylate, 2-methoxyethyl acrylate, 3-mathoxypropyl acrylate and propoxylated acrylates and methacrylates, and other monomers such as ethylene, 1,3- butadiene, isoprene, chloroprene, 1-decene, 1-pentene, and 1-octene. Of these, n-butyl acrylate and 2-ethylhexyl acrylate are usually preferred with n-butyl acrylate being particularly preferred. The proportion of polymerised units of the internally plasticising comonomer in the above-mentioned preferred copolymer compositions for A is more preferably 40 to 80 weight %.

The proportion of polymerised units of vinyl chloride in the above-mentioned preferred copolymer compositions for A is more preferably 0 to 15 weight %.

The proportion of polymerised units of copolymerisable acid in the above-mentioned preferred copolymer compositions for A is more preferably 0.1 to 8 weight %, still more preferably 0.1 to 5 weight %, and yet more preferably 0.1 to 3 weight %.

The contactibility of the adhesive may sometimes be further improved by causing the molecular weight of A to be lower than would result naturally from the copolymerisation to make it. This may readily be achieved by employing a chain transfer agent in the copolymerisation reaction. Suitable chain transfer agents include the long-chain alkyl mercaptans, e.g. n-octyl mercaptan and t-dodecylmercaptan; isopropanol, isobutanol; long-chain alcohols, e.g. lauryl alcohol, t-octyl alcohol; $CCl_4$, $CH_2Cl_2$, and $CBrCl_3$. The amount used is generally 0.2 to 5%, preferably 0.5 to 2%, based on the total weight of monomeric material used.

The composition of copolymer B should be selected to provide a Tg in the range from 0° to 30° C., and more preferably in the range from 2° to 30° C. Another possible range is from 0° to 20° C.

Preferred copolymer compositions for B include the copolymers comprising 10 to 70 weight % of polymerised units of vinylidene chloride, 2 to 90 weight % of polymerised units of at least one comonomer selected from alkyl acrylates and methacrylates having 1 to 12 carbon atoms in the alkyl groups, alkoxyalkyl acrylates and methacrylates having 1 to 12 carbon atoms in the alkyl groups, styrene, acrylonitrile, vinyl acetate and vinyl ethyl ether; 0 to 50 weight % of polymerised units of vinyl chloride, and 0 to 10 weight % of polymerised units of at least one copolymerisable ethylenically unsaturated acid. Minor amounts of polymerised units of at least one other ethylenically unsaturated monomers may optionally be included in these preferred polymeric compositions of B (e.g. 0 to 40 weight %, more preferably 0 to 30 weight %).

The proportion of polymerised units of vinylidene chloride in the above-mentioned preferred copolymer compositions for B is more preferably 35 to 70 weight %.

The proportion of polymerised units of the at least one comonomer (selected from alkyl acrylates and methacrylates having 1 to 12 carbon atoms in the alkyl group, alkoxyalkyl acrylates and methacrylates having 1 to 12 carbon atoms in the alkyl groups, styrene, acrylonitrile, vinyl acetate and vinyl ethyl ether) in the above-mentioned preferred copolymer compositions for B is more preferably 5 to 90 weight %, and still more preferably 5 to 70 weight %.

The proportion of polymerised units of vinyl chloride in the above-mentioned preferred copolymer compositions for B is more preferably 0 to 30 weight %.

The proportion of polymerised units of the copolymerisable acid in the above-mentioned preferred copolymer compositions for B is more preferably 0.1 to 8 weight %, still more preferably 0.1 to 5 weight %, and yet more preferably 0.1 to 3 weight %.

The copolymer B may include polymerised units of at least one internally plasticising comonomer, particularly certain kinds of alkyl and alkoxyalkyl acrylates as exemplified by the list provided above in respect of copolymer A, in order to readily achieve a desired value for Tg within the defined range. Such alkyl and alkoxyalkyl acrylates as exemplified above fall within the scope of the said alkyl and alkoxyalkyl acrylates having 1 to 12 carbon atoms in the alkyl group as set out above in the list of comonomers at least one of which may be used to form the polymerised units in copolymer B. The copolymer B may of course include polymerised units of at least one monomer, selected from monomers within the scope of alkyl acrylates and methacrylates and alkoxyalkyl acrylates and methacrylates having 1 to 12 carbon atoms in the alkyl group, which is not an internally plasticising comonomer. In some embodiments the copolymer B includes units of at least one monomer of the non-internally-plasticising type (e.g. Tg > −40° C.), selected from monomers within the scope of alkyl acrylates and methacrylates having 1 to 12 carbon atoms in the alkyl group and alkoxyalkyl acrylates and methacrylates having 1 to 12 carbon atoms in the alkyl group, and at least one internally plasticising comonomer, selected from monomers within the scope of alkyl and alkoxyalkyl acrylates having 1 to 12 carbon atoms in the alkyl group.

In copolymer B, the at least one comonomer selected from alkyl acrylates and methacrylates having 1 to 12 carbon atoms in the alkyl group, alkoxyalkyl acrylates and methacrylates having 1 to 12 carbon atoms in the alkyl group, styrene, acrylonitrile, vinyl acetate and vinyl ethyl ether, is preferably at least one comonomer selected from alkyl acrylates and methacrylates having 1 to 12 carbon atoms in the alkyl group. Example of such alkyl acrylates and methacrylates include n-butyl acrylate and methacrylate, sec-butyl acrylate, tert-butyl acrylate, cyclohexyl acrylate and methacrylate, n-dodecyl acrylate and methacrylate, ethyl acrylate and methacrylate, 5-ethyl-2-nonyl acrylate, 2-ethylbutyl acrylate, n-heptyl acrylate, n-hexyl acrylate, isobutyl acrylate and methacrylate, isopropyl acrylate and methacrylate, methyl acrylate and methacrylate, 2-methylbutyl acrylate, 3-methylbutyl acrylate, n-octyl acrylate and methacrylate, 2-octyl acrylate, 3-pentyl acrylate and methacrylate, n-propyl acrylate, and 2-ethylhexyl acrylate and methacrylate. As discussed above, some of these monomers are of the internally plasticising type while others are of the non-internally-plasticising type; both types of monomer may be used, either together or alone. Preferably, the at least one comonomer selected from said alkyl acrylates and methacrylates having 1 to 12 carbon atoms in the alkyl group is at least one of methyl methacrylate, n-butyl acrylate and 2-ethylhexyl acrylate; most preferably said at least one comonomer is methyl methacrylate together with n-butyl acrylate.

The copolymer A and/or the copolymer B of the present invention optionally has polymerised units of at least one type of comonomer (the amount typically being 0 to 10 weight %) to provide, when present, a partial (in the sense of a small degree of) cross-linking functionality since this may improve cohesive strength further still. The effect on polymer A, if used alone for bonding, is to improve the creep resistance of the resulting bond although contactability may then be decreased; the addition of polymer B can then surprisingly sometimes provide a polymer composition which results in improved contactability as well as good creep resistance thereby ameliorating any decrease in contactability caused by the use of the cross-linking monomer. Suitable comonomers for providing such a cross-linking functionality include multi-functional copolymerisable monomers. The functionality may be of the type which results in A and/or B becoming partially cross-linked during the polymerisation reaction to form it; comonomers providing this type of cross-linking functionality are polyunsaturated monomers examples of which include allyl methacrylate, diallyl maleate, diallyl phthalate and divinyl benzene. Alternatively the functionality may be of the type which results in A and/or B, or A and B in cooperation (by virtue of A and B having complementary functional groups), becoming partially cross-linked not during polymerisation but subsequent to polymerisation (latent cross-linking) without any external separately added substance either spontaneously at ambient temperature on ageing or more usually under the influence of heat. A further alternative type of functionality is of the type which results in latent cross-linking of A and/or B by the addition of an external separately added substance i.e. a cross-linking agent (e.g. a divalent metal ion such as zinc or zirconium). Examples of comonomers having the above type of cross-linking functionality where latent cross-linking is possible either at ambient temperature on ageing, or by heating, or by virtue of an externally added cross-linking agent, or by more than one of these possibilities, have functional groups capable of cross-linking by various mechanisms including self cross-linking or mutual cross-linking by different functional groups, both in the polymer chain; examples of comonomers providing this type of cross-linking functionality include comonomers having reactive polar groups such as hydroxyl, thiol, amino, amide, isocyanate, nitrile, carboxy, and epoxide groups and examples of such comonomers include glycidyl methacrylate and acrylate, methylaminoethyl methacrylate and acrylate, t-butylaminoethyl methacrylate and acrylate, methacrylamide, 4-pentenoguanamine, hydroxyalkyl esters such as hydroxypropyl methacrylate, hydroxyethyl methacrylate and hydroxyethyl acrylate, methacrylonitrile, N-alkoxyalkyl amides such as methoxymethyl methacrylamide and butoxymethyl acrylamide, and hydroxyalkyl amides such as N-methylol methacrylamide and N-methylol acrylamide, and dicarboxylic acids such as maleic acid. Some comonomers provide both types of functionality, e.g. divinyl ether of 1,4-butendiol, and trimethylol propane triacrylate and trimethacrylate. The at least one monomer to provide a partial cross-linking functionality (if used) is usually used in an amount of 0.01 to 10 (particularly 0.01 to 5) weight % of polymerised units.

In copolymers A and B the at least one ethylenically unsaturated copolymerisable acid (if used), which primarily provides an adhesion-promoting functionality, is preferably an ethylenically unsaturated carboxylic acid or sulphonic acid. Particularly preferred acids are aliphatic alpha, beta-unsaturated carboxylic acids and especially acrylic acid; other carboxylic acids of this type which may be used include methacrylic acid, itaconic acid and citraconic acid. It may be mentioned that the at least one ethylenically unsaturated carboxylic acid can also provide units which impart a latent cross-linking functionality as discussed above if the composition includes an external cross-linking agent.

Other comonomers which provide an adhesion-promoting functionality may be used in conjunction with or in place of the ethylenically unsaturated acid (e.g. in an amount of 0 to 10 weight %).

The emulsion polymerisations to form the copolymers A and B may be carried out by well-established techniques; for example, copolymerisation in an aqueous medium with the aid of a free-radical initiator and usually in the presence of a surface active agent and in appropriate cases with some monomer feeding during the polymerisation to an initial monomer charge to preserve compositional homogeneity.

The vinylidene chloride aqueous latex compositions of the invention may be used in contact adhesive applications without the inclusion therein of a tackifying resin, thereby considerably simplifying any formulation aspects for the adhesives producer. However, the inclusion of at least one certain tackifying resin in the aqueous latex composition of the invention (usually in an amount of 5 to 100% by weight, more usually 10 to 60% by weight, based on the dry weight of copolymers A and B) may be advantageous in many cases to improve still further the adhesive performance of the composition and is generally preferred. This is particularly the case for improving the performance of compositions in which the copolymer A has Tg in the higher part of the claimed Tg range. Suitable tackifying resins known to the art for improving properties such as contactability, cohesive strength and creep behaviour in contact adhesives include phenolic resins (such as heat reactive alkylphenol/formaldehyde resins, hydroxyalkylated alkylphenol/formaldehyde resins and thermoplastic terpene/phenolic resins), certain rosin esters (e.g. ones derived by esterifying tall oil rosins with glycerol or pentaerythritol), hydrogenated rosins, and coumarone-/indene resins. The aqueous latex compositions of the invention may also include substances such as thickeners, stabilizers, humectants, fillers, surfactants, pigments, dyes, fungicides, coalescing agents, cross-linking agents, and/or other materials required for any particular application.

The above substances (if used) may be incorporated or formulated into the latex compositions of the present invention by any suitable technique, e.g. by simple mixing and stirring.

The compositions of the present invention may be used to provide contact adhesion for a variety of substrates, the materials joined either being the same or (more usually) different. Such substrates include wood, paper, various forms of panelling such as plyboard, particleboard, plasterboard, various plastics materials, various minerals such as glass, asbestos, carbon fibre, concrete, plaster and ceramics, and metals such as iron, steel and aluminium.

The present invention is illustrated by the following examples; the prefix C in an example denotes a comparative example; unless otherwise specified all parts, percentages, and ratios are on a weight basis.

Contactability in the examples is assessed by applying two brush coats of the aqueous latex composition (intended to provide the contact adhesive) to unproofed cotton duck (i.e. unproofed canvas), allowing the first brush coat to dry as indicated by a clearness of the adhesive film before applying the second coat. When the second adhesive coat is dry the coated surfaces are brought together under light hand roller pressure to form the adhesive bond the strength of which is then tested immediately as a 25 mm wide strip on an Instron tensile testing machine set at a crosshead speed of 10 cm/minute. By considering the initial bond strength it is possible to determine whether interfilm coalescence has occured and hence whether or not the adhesive is contactible.

Creep at elevated temperatures or creep resistance unless otherwise specified is determined by preparing a test specimen as for contactability but making the adhesive bond under a load of 3.5 Kg/cm$^2$ for 60 seconds and ageing for 7 days prior to testing. Creep resistance is assessed by equilibrating the sample at 60° C. and recording the distance peeled or crept in mm/minute under a static load of 1 Kg.

The key to the monomer notation used in the examples is as follows:

VDC vinylidene chloride
AA acrylic acid
EHA 2-ethylhexyl acrylate
VC vinyl chloride
BA n-butyl acrylate
AM allyl methacrylate
MMA methyl methacrylate All the copolymers were prepared by conventional emulsion polymerisation in an aqueous medium using a free-radical-yielding initiator and a surface active agent. The solids contents of the aqueous latices so produced were in the range 53 to 55%. All the copolymers were amorphous as would be expected from their composition (yielding clear flexible films). Tg was determined in each case by differential scanning calorimetry.

EXAMPLES C1 TO C6

Examples C1, to C3, and C6 (see Table 1) are examples using aqueous latex compositions containing copolymer A in the absence of copolymer B. Examples C4 and C5 are examples of aqueous latex compositions of copolymers outside the scope of copolymer A by virtue of having Tg $\geq 0$. The measurement of contactibility for Examples C1 to C5 show that at Tg's $\leq 0$ contactability was lost. The low creep resistance which tends to be achieved with copolymer A alone is evident. Example C6 (see Table 1) demonstrates the beneficial effect on creep resistance by the provision of a partial crosslinking functionality of the type in which cross-linking occurs during the copolymerisation; however contactability in this case is decreased.

TABLE 1

| Example No | Copolymer A Composition | Tg °C. | Contactability (Initial Bond Strength) Kg | Creep Resistance mm/min |
|---|---|---|---|---|
| C1 | VDC/EHA/AA 28.0/70.0/2.0 | −35 | 3.1 | 88 |
| C2 | VDC/EHA/AA 38.4/59.6/2.0 | −25 | 1.8 | 40 |
| C3 | VDC/BA/AA 28.7/69.3/2.0 | −13 | 2.2 | 68 |
| C4 | VDC/BA/AA 48.1/49.9/2.0 | 0 | 0 | — |
| C5 | VDC/BA/AA 60.5/37.5/2.0 | +6 | 0 | — |
| C6 | VDC/VC/EHA/AA/AM 48.5/7.5/42.0/2.0/0.2 | −16 | 0.2 | 12 |

EXAMPLES C7 TO C17

Examples C7 to C17 (Table 2) are examples using aqueous latex compositions containing copolymer B in the absence of copolymer A and demonstrate the complete absence of contactability but higher creep resistance in comparison to the use of copolymer A alone. Because of the lack of contactability, creep resistance was determined on test specimens bonded by the two way wet stick technique which is only possible to perform with the lower Tg copolymers. (By the two way wet stick technique is meant that the latex is applied to both surfaces to be bonded and the bond made before a substantial quantity of the aqueous carrier has evaporated). Example C17 demonstrates the beneficial effect on creep resistance (for polymers of comparable Tg) by the provision of a partial crosslinking functionality of the type in which cross-linking occurs during the copolymerisation.

TABLE 2

| Example No. | Copolymer B Composition | Tg °C. | Contactability (Initial Bond Strength) Kg | Creep Resistance mm/min |
| --- | --- | --- | --- | --- |
| C7 | VDC/BA/MMA/AA 45.5/46.1/6.4/2.0 | +6 | 0 | 1.25 |
| C8 | VDC/BA/MMA/AA 59.4/35.5/3.1/2.0 | +9 | 0 | 2.3 |
| C9 | VDC/BA/MMA/AA 38.0/50.1/9.9/2.0 | +9 | 0 | 0.85 |
| C10 | VDC/BA/MMA/AA 66.6/26.4/5.0/2.0 | +10 | 0 | 1.2 |
| C11 | VDC/BA/MMA/AA 55.9/35.5/6.6/2.0 | +12 | 0 | 0.2 |
| C12 | VDC/BA/MMA/AA 50.3/35.6/12.1/2.0 | +13 | 0 | 0.5 |
| C13 | VDC/BA/MMA/AA 58.5/30.8/8.7/2.0 | +16 | 0 | — |
| C14 | VDC/VC/MMA/AA 68.4/25.8/3.8/2.0 | +16 | 0 | — |
| C15 | VDC/BA/MMA/AA 57.5/26.9/13.6/2.0 | +22 | 0 | — |
| C16 | VDC/BA/MMA/AA 58.8/21.7/17.5/2.0 | +30 | 0 | — |
| C17 | VDC/VC/EHA/AA/AM 68.6/22.4/6.8/2.0/0.2 | +3 | 0 | 0.6 |

EXAMPLES 18 TO 33

Examples 18 to 33 (Table 3) are examples according to the invention of aqueous latex compositions containing copolymer A blended with copolymer B and demonstrate the improvement in the creep resistance obtained with each blend in comparison with the copolymer A component of that blend alone whilst exhibiting acceptable contactability. The polymers are identified from the previous example numbers.

TABLE 3

| Example No. | Copolymer Blend A:B | Ratio A:B (ratio of latex solids) | Contactability (Initial Bond Strength) Kg | Creep Resistance mm/min |
| --- | --- | --- | --- | --- |
| 18 | C1:C7 | 50:50 | 1.8 | 35 |
| 19 | C1:C9 | 50:50 | 1.5 | 9 |
| 20 | C1:C10 | 75:25 | 3.4 | 30 |
| 21 | C1:C10 | 50:50 | 1.7 | 14 |
| 22 | C1:C11 | 75:25 | 4.0 | 25 |
| 23 | C1:C11 | 50:50 | 1.6 | 15 |
| 24 | C1:C13 | 75:25 | 3.4 | 33 |
| 25 | C1:C15 | 75:25 | 3.4 | 18 |
| 26 | C1:C16 | 75:25 | 3.7 | 15 |
| 27 | C1:C17 | 75:25 | 2.9 | 30 |
| 28 | C1:C14 | 75:25 | 3.0 | 22 |
| 29 | C2:C8 | 25:75 | 1.0 | 18 |
| 30 | C6:C12 | 75:25 | 0.6 | 9 |
| 31 | C3:C12 | 75:25 | 3.0 | 13 |
| 32 | C3:C12 | 66.6/33.4 | 3.8 | 10 |
| 33 | C3:C15 | 66.6/33.4 | 2.3 | 18 |

EXAMPLES 34 TO 37

Examples 34 to 37 (Table 4) are examples of blends of aqueous latices of copolymer A and copolymer B to which a tackifying resin, Ucar Phenolic Resin dispersion BKUA 2370 manufactured by Union Carbide, has been added by simple mixing and stirring. The examples demonstrate a maturing of the adhesive bond on ageing for 7 days.

TABLE 4

| Example No. | Copolymer Blend A:B | Ratio A:B (ratio of latex solids) | Resin (% on Polymer Blend) | Contactability (Initial Bond Strength) Kg | Bond Strength After 7 days Kg |
| --- | --- | --- | --- | --- | --- |
| 34 | C3:C15 | 75:25 | 33 | 3.6 | 5.8 |
| 35 | C3:C15 | 66.6:33.4 | 33 | 3.8 | 6.0 |
| 36 | C3:C16 | 75:25 | 33 | 3.6 | 5.7 |
| 37 | C3:C16 | 66.6:33.4 | 33 | 3.2 | 3.9 |

EXAMPLE C38

Example C38 is an example of an aqueous latex of a single amorphous copolymer having the same average composition (VDC/BA/MMA/AA; 39.7/54.0/4.3/2.0) as the blend of copolymers denoted by Example 33; the Tg of this copolymer was +1° C. The "contactibility", as measured by initial bond strength, of Example C38 was found to be 1.0 Kg, i.e. lower than the value of 2.3 Kg for the corresponding blend composition. More importantly, examination of the bond area immediately after testing showed that unlike all the blend examples where bond failure was cohesive (i.e. failure taking place in the body of the adhesive bond showing that interfilm coalescence had occured) the bond failure of Example C38 had taken place at the interface of the film/film bond showing that interfilm coalescence had not occurred. Thus although a measurable value for contactibility was achieved in Example C38 (as indicated by initial bond strength) the composition was not acceptable as no interfilm coalescence had occurred. The achievement of a measurable value of initial bond strength was due wholly to surface tack.

EXAMPLES 39 TO 43

These Examples (Table 5) are intended to show the beneficial effect that can be achieved when copolymer A and copolymer B include polymerised units that provide a latent cross-linking functionality caused by the presence of an external cross-linking agent. Example 39, which is still according to the invention, exemplifies an aqueous latex blend of the copolymers of Examples 3 and 15; both copolymers include polymerised units of acrylic acid but the composition does not include an external cross-linking agent so that these units do not provide a latent cross-linking functionality. In Examples 40 to 43 the same copolymer blend is used but the composition also includes an added cross-linking agent (as indicated). Consequently in Examples 40 to 43 the acrylic acid units provide a latent cross-linking functionality and the beneficial effect on creep resistance is readily evident.

TABLE 5

| Example No. | Copolymer Blend A:B | Ratio A:B (ratio of latex solids) | Cross-linking Agent in composition and amount (% on polymer solids) | Contactability (Initial Bond Strength) Kg | *Creep Resistance mm/min |
| --- | --- | --- | --- | --- | --- |
| 39 | C3:C15 | 75:25 | None | 3.9 | 26 |
| 40 | C3:C15 | 75:25 | zinc oxide (0.29) | 3.8 | 6 |
| 41 | C3:C15 | 75:25 | zinc oxide (0.56) | 1.9 | 0.8 |

TABLE 5-continued

| Example No. | Copolymer Blend A:B | Ratio A:B (ratio of latex solids) | Cross-linking Agent in composition and amount (% on polymer solids) | Contactability (Initial Bond Strength) Kg | *Creep Resistance mm/min |
|---|---|---|---|---|---|
| 42 | C3:C15 | 75:25 | zirconium oxide (2.13) | 3.1 | 5.3 |
| 43 | C3:C15 | 75:25 | zirconium oxide (4.26) | 3.8 | 2.6 |

*samples for creep resistance were prepared by the same method as for determining contactibility, i.e. light hand roller pressure was used.

We claim:

1. An aqueous latex composition comprising at least one copolymer A and at least one copolymer B, characterized in that
   A is an amorphous copolymer comprising polymerised units of vinylidene chloride and at least one internally plasticising comonomer; and which copolymer has a Tg in the range from $-50$ to $<0°$ C; and
   B is an amorphous copolymer comprising polymerised units of vinylidene chloride and at least one comonomer selected from alkyl acrylates and methacrylates having 1 to 12 carbon atoms in the alkyl group, alkoxyalkyl acrylates and methacrylates having 1 to 12 carbon atoms in the alkyl groups, styrene, acrylonitrile, vinyl acetate, and vinyl ethyl ether; and which copolymer has a Tg in the range 0° to 30° C.; and wherein the dry weight ratio of the at least one copolymer A: the at least one copolymer B is from 95:5 to 10:90, and wherein said composition provides contactable layers after drying.

2. An aqueous latex according to claim 1 characterised in that at least one of said at least one copolymer A in said composition comprises polymerised units of vinyl chloride.

3. An aqueous latex composition according to either claim 1 or claim 2 characterised in that at least one of said at least one copolymer B in said composition comprises polymerised units of vinyl chloride.

4. An aqueous latex composition according to any one of the preceding claims characterised in that at least one of said at least one copolymer A in said composition comprises polymerised units of at least one copolymerisable ethylenically unsaturated acid.

5. An aqueous latex composition according to any one of the preceding claims characterised in that at least one of said at least one copolymer B in said composition comprises polymerised units of at least one copolymerisable ethylenically unsaturated acid.

6. An aqueous latex composition according to any one of the preceding claims characterised in that the dry weight ratio of the at least one copolymer A: the at least one copolymer B is from 10:90 to 90:10.

7. An aqueous latex composition according to any one of the preceding claims characterised in that the Tg of the at least one copolymer A is in the range from $-40°$ to $-5°$ C.

8. An aqueous latex composition according to any one of the preceding claims characterised in that said at least one copolymer A comprises 10 to 70 weight % of polymerised units of vinylidene chloride, 30 to 90 weight % of polymerised units of said at least one internally plasticising comonomer, 0 to 20 weight % of polymerised units of vinyl chloride and 0 to 10 weight % of polymerised units of at least one copolymerisable ethylenically unsaturated acid.

9. An aqueous latex composition according to claim 8 characterised in that the proportion of polymerised units of vinylidene chloride is 20 to 60 weight %.

10. An aqueous latex composition according to either claim 8 or claim 9 characterised in that the proportion of polymerised units of said at least one internally plasticising comonomer in copolymer A is 40 to 80 weight %.

11. An aqueous latex composition according to any one of claims 8 to 10 characterised in that the proportion of polymerised units of vinyl chloride in copolymer A is 0 to 15 weight %.

12. An aqueous latex composition according to any one of claims 8 to 11 characterised in that the proportion of polymerised units of said at least one ethylenically unsaturated acid is 0.1 to 8 weight %.

13. An aqueous latex composition according to any one of the preceding claims characterised in that the at least one internally plasticising comonomer is n-butyl acrylate.

14. An aqueous latex composition according to any one of the preceding claims characterised in that copolymer A has been prepared in the presence of a chain transfer agent.

15. An aqueous latex composition according to any one of the preceding claims characterised in that the Tg of said at least one copolymer B is in the range from 2° to 30° C.

16. An aqueous latex composition according to any one of claims 1 to 14 characterised in that the Tg of said at least one copolymer B is in the range from 0° to 20° C.

17. An aqueous latex composition according to any one of the preceding claims characterised in that said at least one copolymer B comprises 10 to 70 weight % of polymerised units of vinylidene chloride, 2 to 90 weight % of polymerised units of at least one comonomer selected from alkyl acrylates and methacrylates having 1 to 12 carbon atoms in the alkyl group, alkoxyalkyl acrylates and methacrylates having 1 to 12 carbon atoms in the alkyl groups, acrylonitrile, vinyl acetate, and vinyl ethyl ether; 0 to 50 weight % of polymerised units of vinyl chloride; and 0 to 10 weight % of at least one copolymerisable ethylenically unsaturated acid.

18. An aqueous latex composition according to claim 17 characterised in that the proportion of polymerised units of vinylidene chloride is 35 to 70 weight %.

19. An aqueous latex composition according to either claim 17 or claim 18 characterised in that the proportion of polymerised units of the at least one monomer selected from alkyl acrylates and methacrylates having 1 to 12 carbon atoms in the alkyl groups, alkoxyalkyl acrylates and methacrylates having 1 to 12 carbon atoms in the alkyl groups, styrene, acrylonitrile, vinyl acetate, and vinyl ethyl ether, is 5 to 90 weight %.

20. An aqueous latex composition according to any one of claims 17 to 19 characterised the proportion of polymerised units of vinyl chloride is 0 to 30 weight %.

21. An aqueous latex composition according to any one of claims 17 to 20 characterised in that the proportion of Polymerised units of said at least one ethylenically unsaturated acid is 0.1 to 8 weight %.

22. An aqueous latex composition according to any one of the preceding claims characterised in that said at least one copolymer B includes units of at least one internally plasticising comonomer.

23. An aqueous latex composition according to any one of the preceding claims characterised in that said at least one copolymer B includes units of at least one comonomer within the scope of alkyl acrylates and methacrylates having 1 to 12 carbon atoms in the alkyl group and alkoxyalkyl acrylates and methacrylates having 1 to 12 carbon atoms in the alkyl group which comonomer is not an internally plasticising comonomer.

24. An aqueous latex composition according to any one of the preceding claims characterised in that the at least one comonomer providing polymerised units in copolymer B selected from alkyl acrylates and methacrylates having 1 to 12 carbon atoms in the alkyl group, alkoxyalkyl acrylates and methacrylates having 1 to 12 carbon atoms in the alkyl groups, styrene, acrylonitrile, vinyl acetate, and vinyl ethyl ether, is at least one alkyl acrylate or methacrylate having 1 to 12 carbon atoms in the alkyl group.

25. An aqueous latex composition according to any one of the preceding claims characterised in that said at least one comonomer providing polymerised units in copolymer if selected from alkyl acrylates and methacrylates having 1 to 12 carbon atoms in the alkyl group is at least one of methyl methacrylate, n-butyl acrylate and 2-ethylhexyl acrylate.

26. An aqueous latex composition according to claim 25 characterised in that said at least one comonomer is methyl methacrylate together with n-butyl acrylate.

27. An aqueous latex composition according to any one of claims 4 to 26 characterised in that the at least one copolymerisable ethylenically unsaturated acid if present as polymerised units in copolymer A and/or copolymer B is an ethylenically unsaturated carboxylic acid or sulphonic acid.

28. An aqueous latex composition according to claim 27 characterised in that the acid is an aliphatic alpha, beta-unsaturated carboxylic acid.

29. An aqueous latex composition according to any one of the preceding claims characterised in that the copolymer A and/or copolymer B comprise polymerised units of at least one type of comonomer to provide a cross-linking functionality.

30. An aqueous latex composition according to claim 29 characterised in that said polymerised units provide a cross-linking functionality which effects cross-linking during the polymerisation to form the copolymer.

31. An aqueous latex composition according to claim 29 characterised in that said polymerised units to provide a cross-linking functionality provide a latent cross-linking functionality.

32. An aqueous latex composition according to claim 31 characterised in that the latent cross-linking provided by said polymerised units requires the inclusion of a cross-linking agent in the composition.

33. An aqueous latex composition according to claim 1 characterised in that said latex composition includes at least one tackifying resin, which tackifying resin has been added in the form of a dispersion.

34. The use of an aqueous latex composition according to any one of the preceding claims as a contact adhesive-forming composition.

* * * * *